United States Patent
Roscio et al.

(10) Patent No.: US 11,544,228 B2
(45) Date of Patent: Jan. 3, 2023

(54) ASSIGNMENT OF QUORA VALUES TO NODES BASED ON IMPORTANCE OF THE NODES

(71) Applicant: Hewlett Packard Enterprise Development LP, Houston, TX (US)

(72) Inventors: Steven Roscio, Monument, CO (US); Paul Vencel, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 235 days.

(21) Appl. No.: 16/868,874

(22) Filed: May 7, 2020

(65) Prior Publication Data
US 2021/0349860 A1 Nov. 11, 2021

(51) Int. Cl.
*G06F 16/00* (2019.01)
*G06F 16/18* (2019.01)
(Continued)

(52) U.S. Cl.
CPC ...... *G06F 16/1815* (2019.01); *G06F 11/1451* (2013.01); *G06F 11/1461* (2013.01);
(Continued)

(58) Field of Classification Search
CPC ............ G06F 16/2322; G06F 16/1865; G06F 16/182; G06F 16/1815; G06F 11/1469;
(Continued)

(56) References Cited

U.S. PATENT DOCUMENTS

| 7,620,845 B2 | 11/2009 | Endo | |
| 7,739,677 B1 * | 6/2010 | Kekre | .............. G06F 11/1425 717/121 |

(Continued)

FOREIGN PATENT DOCUMENTS

| WO | WO2004031979 A2 * | 4/2004 |
| WO | WO2011060965 A1 * | 5/2011 |

(Continued)

OTHER PUBLICATIONS

Feng Lu et al., "An adaptive multi-level caching strategy for Distributed Database System", / Future Generation Computer Systems 97 (2019) pp. 61-688.*

(Continued)

*Primary Examiner* — Srirama Channavajjala
(74) *Attorney, Agent, or Firm* — Mauriel Kapouytian; Woods LLP

(57) ABSTRACT

Embodiments described herein are generally directed to techniques for avoiding or mitigating shared-state damage during a split-brain condition in a distributed network of compute nodes. According to an example, a number, N, of nodes within the distributed computing system is determined. During normal operation of the distributed computing system, a unified state is maintained by synchronizing shared state information. The nodes are ordered by increasing importance to an application from 1 to N. A quora value, $q_n$, is assigned to each of the nodes in accordance with the ordering, where $q_1=1$ and each subsequent quora value, $q_{n+1}$, is a sum of all prior quora values, $q_1$ to $q_n$, plus either 1 or a current value of n. These quora values may then be used to determine membership in the dominant or a yielding set to facilitate recovery from the split-brain condition by performing pessimistic or optimistic mitigation actions.

20 Claims, 9 Drawing Sheets

(51) Int. Cl.
*G06F 16/182* (2019.01)
*G06F 11/14* (2006.01)
*G06F 16/23* (2019.01)
*G06F 16/178* (2019.01)
*G06F 16/27* (2019.01)

(52) U.S. Cl.
CPC ...... *G06F 11/1464* (2013.01); *G06F 11/1469* (2013.01); *G06F 16/178* (2019.01); *G06F 16/182* (2019.01); *G06F 16/1865* (2019.01); *G06F 16/2322* (2019.01); *G06F 16/275* (2019.01)

(58) Field of Classification Search
CPC ............. G06F 11/1464; G06F 11/1461; G06F 11/1451; G06F 11/1438; G06F 11/2028; G06F 11/1425; G06F 9/3891; G06F 9/5061; G06F 16/178; G06F 16/275
See application file for complete search history.

(56) References Cited

U.S. PATENT DOCUMENTS

| | | | | |
|---|---|---|---|---|
| 7,783,933 B2* | 8/2010 | Archer | ................ | G06F 11/3409 714/47.2 |
| 7,843,811 B2 | 11/2010 | Armstrong et al. | | |
| 8,006,129 B2* | 8/2011 | Banks | ................ | G06F 11/2028 714/48 |
| 8,024,432 B1* | 9/2011 | Sharma | ................ | G06F 9/5061 709/224 |
| 8,108,715 B1 | 1/2012 | Agarwal | | |
| 8,498,967 B1 | 7/2013 | Chatterjee et al. | | |
| 8,595,546 B2 | 11/2013 | Dalton | | |
| 8,806,264 B2 | 8/2014 | Kampouris et al. | | |
| 8,824,261 B1* | 9/2014 | Miller | ................ | G11B 33/142 369/53.42 |
| 10,643,216 B2* | 5/2020 | Sadaghiani | ......... | H04L 63/1416 |
| 10,645,204 B2* | 5/2020 | Dubey | ................ | H04L 41/0668 |
| 2010/0205273 A1* | 8/2010 | Shim | ................ | G06F 11/1425 709/210 |
| 2012/0054546 A1* | 3/2012 | Kampouris | ......... | G06F 11/0709 707/E17.007 |
| 2012/0222034 A1* | 8/2012 | Ishikawa | ............. | G06F 11/1438 718/102 |
| 2013/0191453 A1* | 7/2013 | Nishanov | .............. | G06F 9/5061 709/204 |
| 2014/0173330 A1 | 6/2014 | Samanta et al. | | |
| 2014/0280247 A1* | 9/2014 | Pingenot | ............. | G06F 16/2471 707/752 |
| 2017/0094003 A1* | 3/2017 | Gahlot | ................ | G06F 11/2094 |
| 2018/0176082 A1* | 6/2018 | Katz | ................... | H04L 41/0816 |
| 2021/0182116 A1* | 6/2021 | Muleshkov | ........... | G06F 9/3891 |

FOREIGN PATENT DOCUMENTS

| | | | |
|---|---|---|---|
| WO | WO2013063152 A1 | * | 5/2013 |
| WO | WO2013171552 A1 | * | 11/2013 |
| WO | WO-2016050074 A1 | | 7/2016 |

OTHER PUBLICATIONS

Daniel Dauwe et al., "An Analysis of Multilevel Checkpoint Performance Models", IEEE International Parallel and Distributed Processing Symposium Workshops, 2018, pp. 783-792.*
Feng Jiang et al., "A Novel Weight-based Leader Election Approach for Split Brain in Distributed System ", IOP Conf. Series: Materials Science and Engineering 719 (2020) 012005, 2020, pp. 1-5.*
M. Bearden et al., "Using hysteresis to reduce adaptation cost of a dynamic quorum assignment", Proceedings. 19th IEEE International Conference on Distributed Computing Systems (Cat. No. 99CB37003), Aug. 2002, pp. 1-11.*
Davidson et al., "Consistency in Partitioned Networks", ACM, vol. 17(3), Sep. 1985, 30 pages.
Wikipedia, "List of TCP and UDP port numbers", available online at <https://en.wikipedia.org/w/index.php?title=List_of_TCP_and_UDP_port_numbers&oldid=939859314> Feb. 9, 2020, 69 pages.
Wikipedia, "Split-brain (computing)", available online at <https://en.wikipedia.org/wiki/Split-brain_(computing)>, Jul. 5, 2019, 2 pages.
MARIADB, "Quorum Components," 2014, pp. 1-4, Retrieved from the Internet on Feb. 6, 2020 at URL: <galeracluster.com/library/documentation/weighted-quorum.html>.

* cited by examiner

ASSIGNMENT OF QUORA VALUES TO NODES BASED ON IMPORTANCE OF THE NODES

BACKGROUND

In distributed computing systems in which a shared state is synchronized across multiple interconnected compute nodes, it is possible for subsets of the nodes to become completely isolated from each other as a result of a fault condition, for example, a failure in the communication infrastructure through which the nodes are connected. This partitioning of nodes into subsets (referred to as "islands") is known as a split-brain condition.

During the split-brain condition, the islands remain functional and may continue to receive requests from client systems. In response to these requests, unless appropriate mitigation measures are put in place, the shared state may become inconsistent across the islands.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
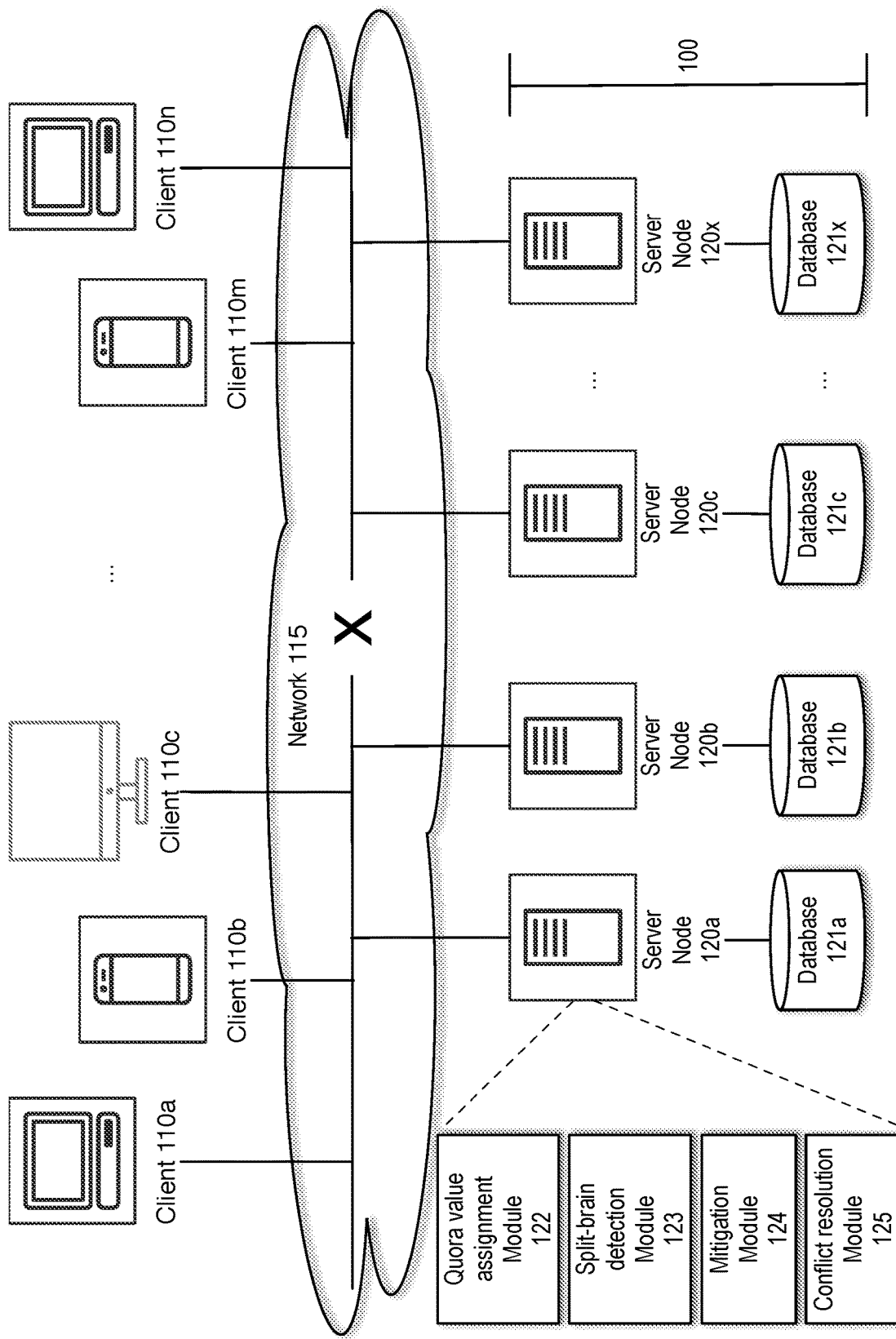
FIG. 1 is a block diagram conceptually illustrating components of a distributed computing system in accordance with an example embodiment.

Embodiments described herein are generally directed to techniques for avoiding or mitigating shared-state damage during a split-brain condition in a distributed network of compute nodes. In the following description, numerous specific details are set forth in order to provide a thorough understanding of example embodiments. It will be apparent, however, to one skilled in the art that embodiments described herein may be practiced without some of these specific details.

As noted above, during a split-brain condition, when islands of nodes of a distributed computing system that share dynamically changing state continue to receive and process requests from client systems, the versions of the shared state as seen by the islands may diverge. When the split-brain condition is resolved, it may not be possible to restore a consistent shared state among the nodes. As such, upon detecting a split-brain condition, embodiments described herein seek to minimize actions that may produce inconsistencies within the shared state and seek to facilitate automated restoration of the shared state to the extent such inconsistencies arise.

In general, in the context of various embodiments described herein, each node may periodically check for the existence of a split-brain condition. When a split-brain condition is detected, each node determines whether it is part of the dominant set or a yielding set. In one embodiment, static weighting values (e.g., quora values) may be selected and assigned to the nodes in accordance with their relative importance to the application or service provided by the nodes of the distributed system to ensure there are zero or one dominant sets among all possible partitions of the nodes. Depending upon the particular implementation, during the split-brain condition, the distributed system may be configured to perform one of multiple mitigation approaches, including pessimistic mitigation and an optimistic mitigation.

In one embodiment, pessimistic mitigation may involve allowing the nodes in the dominant set to continue to accept client requests that modify the shared state while precluding the nodes in the yielding set to perform any action that modifies the shared state. While such a pessimistic mitigation approach avoids inconsistencies in the shared state, it does so at the expense of leaving the distributed system with lowered capacity by essentially shutting down the yielding set of nodes.

In one embodiment, optimistic mitigation allows all nodes to continue processing client requests that may modify the shared state. In this manner, the distributed system is able to maintain similar request processing capacities prior to and during the split-brain condition. Upon resolution of the split-brain condition, however, a conflict resolution process should be performed as the unified state is restored so as to address any conflicting state modifications made by continued operation of multiple islands, for example, a dominant set and one or more yielding sets. Further details regarding the conflict resolution approach are described below.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A "distributed system" generally refers to a collection of autonomous computing elements (also referred to herein as "nodes") that appears to its users (e.g., people or applications) as a single coherent system. The nodes of a distributed system may include components executed on or represented by different computer elements or computer systems that are coupled in communication and which communicate and coordinate their actions. The nodes of a distributed system interact with one another in order to achieve a common goal, for example, support and/or provision of a particular application or service. The nodes of a distributed systems may be coupled in communication via a communication interconnect (e.g., a bus, a switch fabric, a wireless or wired network, or a combination thereof) and are typically spread over multiple failure domains to enhance service availability. For example, geographically distributed nodes may be coupled in communication via one or more private and/or public networks (e.g., the Internet). There are various types of distributed systems, including distributed computing systems, distributed information systems and distributed pervasive (or ubiquitous) systems. Examples of distributed computing systems, which are typically used for high performance computing tasks, include cluster and cloud computing systems and grid computing systems. Examples of distributed information systems, which are typically used for management and integration of business functions, include transaction processing systems and Enterprise Application Integration. Examples of distributed pervasive (or ubiquitous) systems, which typically include mobile and embedded systems, include home systems and sensor networks.

A "service" or an "application" generally refers to a process or function performed by or otherwise supported in whole or in part by a distributed system. For example, the nodes of the distributed system may make some contribution to a service provided by its user(s) (e.g., upstream systems or applications) in the form of providing server services, storage services, storage networking services, computing resources, storage resources and/or networking resources on behalf of the user(s). Alternatively, the nodes of the distributed system may be responsible for and effectively represent the entirety of the service. Non-limiting examples of a service include a webservice, cloud management, cloud infrastructure services, a distributed application, a managed service, and transaction processing. Embodiments described herein may be particularly well-suited to services requiring strong consistency.

A "node" generally refers to an autonomous computing element. The nodes of a distributed system may be computer systems (e.g., clients, servers or peers) in virtual or physical form, one or more components of a computer system, computing elements, hardware devices, software entities or processes, or a combination thereof. Non-limiting examples of nodes include a software process (e.g., a client or a server), redundant hardware within the same device, a virtual machine, a virtual controller of a storage software stack, a storage server, a compute server, a container, a pod or collection of containers, a hyperconverged platform, a data virtualization platform, a sensor, and an actuator.

As used herein the "quorum value" generally refers to a minimum threshold for determining when a particular node of a distributed system is in a dominant set (defined below) or a yielding set (defined below). According to one embodiment, the quorum value represents a strict majority of the weighted votes of the nodes of the distributed system. For example, the quorum value may be set to a value equal to one half of the sum of the quora values (defined below) of all of the nodes participating in the distributed system, plus one.

As used herein a "quora value" of a particular node of a distributed system generally refers to the particular node's voting weight in connection with evaluating whether a set of nodes represents a dominant set or a yielding set. In one embodiment, quora values may be selected and assigned to each of the nodes participating in the distributed system to guarantee any possible partitioning will have fewer than two dominant sets. In one embodiment, the quora values are assigned to nodes in accordance with their relative importance to the application provided by the distributed system.

As used herein a "pretense value" of a particular node of a distributed system at a particular time generally refers to a sum of all of the quora values of nodes of the distributed system that are reachable by the particular node at the particular time.

As used herein a "dominant set" of nodes of a distributed system generally refers to a subset of all nodes participating in a distributed system in which each node of the subset of nodes has a pretense value greater than or equal to the quorum value. In various embodiments described herein, there should be one and only one dominant set.

As used herein a "yielding set" of nodes of a distributed system generally refers to a subset of all nodes participating in a distributed system in which each node of the subset of nodes has a pretense value less than the quorum value.

FIG. 1 is a block diagram conceptually illustrating components of a distributed computing system 100 in accordance with an example embodiment. In the context of the present example, the distributed computing system 100 includes multiple nodes (e.g., server nodes 120*a-x*), providing an application or a service (not shown) consumed by users (not shown) of clients 110*a-n*. When operating under normal circumstances in which all nodes are reachable by each other via a communication interconnect (e.g., network 115), the nodes maintain a shared state, for example, by synchronizing databases 121*a-x* to reflect changes made to the shared state as a result of processing requests received from the clients 110*a-n*.

In the present example, a failure of some kind (e.g., a power failure, an communication infrastructure failure, or the like) has resulted in a network partition in which server nodes 120*a-b* represent one island of nodes and server nodes 120*c-x* represent another island of nodes. This state of the distributed computing system 100 represents an example of a split-brain condition. Ideally, during existence of a split-brain condition, a deterministic algorithm or set of algorithms implemented by the nodes allows each node to determine whether it is part of a dominant set of nodes or a yielding set of nodes and allows the nodes to perform damage avoidance and mitigation, for example, by operating in accordance with a predefined or configurable mitigation mode as described herein.

In the context of the present example, server node 120*a* includes a quora value assignment module 122, a split-brain detection module 123, a mitigation module 124, and a conflict resolution module 125. In one embodiment, the quora value assignment module 122 may be associated with a separate computer system (not shown), for example, operated by an administrator of the distributed computer system 100 and may be used to select and assign quora values to the nodes. Alternatively, one of the nodes (e.g., server node 120*a* may operate as both an administrative or management node as well as participating in the distributed computer system 100).

In one embodiment, the quora value assignment module 122 assigns a static quora value to each node of the distributed system. The static quora values may be generated and then distributed to the nodes, for example, as part of a configuration file that is read by the nodes at startup or when the application or service is launched. Those skilled in the art will appreciate there are a number of ways to provide the nodes with their respective quora values. For example, the administrator may have the ability to configure various settings, including the quora value, by accessing the nodes via a management interface running on the separate computer system or on the administrator or management node. As those skilled in the art will appreciate, an optimal quora value assignment would result in one dominant set regardless of the partitioning and regardless of a node failure. Since no such optimal quora value assignment exists for a group of three or more nodes as illustrated below, embodiments herein seek to identify a good quora value assignment that minimizes sub-optimal scenarios in which no dominant set exists during a split-brain condition. An example of quora value assignment processing is described below with reference to FIG. 2.

In the example embodiments described herein, it is assumed all nodes of the distributed computing system include split-brain detection functionality, mitigation functionality, and conflict resolution functionality, for example, provided by their own local split-brain detection module 123, mitigation module 124, and conflict resolution module 125, respectively. An example of split-brain detection processing that may be performed by the split-brain detection module 123 is described below with reference to FIG. 3. An example of mitigation processing that may be performed by the mitigation module 124 is described below with reference to FIGS. 4-6. An example of conflict resolution processing that may be performed by the conflict resolution module 125 is described below with reference to FIG. 7.

The modules described above with reference to FIG. 1 and the processing described below with reference to the flow diagrams of FIG. 2-7 may be implemented in the form of executable instructions stored on a non-transitory machine readable medium and executed by a hardware processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIGS. 8-9 below.

Before discussing an example approach for selection of quora values, various partitioning scenarios are described below with reference to Tables 1-5. In the various simplified quora value scenarios and partitioning examples described below, including two and three-member node groups, the following conventions are employed:

The nodes of two-member node groups are referred to as A and B.

The nodes of three-member node groups are referred to as A, B, and C.

The nodes within a partition set (or island) are enclosed within a pair of parentheses.

The quorum value Q is computed as:

$$Q = 1 + \left\lfloor \frac{\sum_{i=1}^{n} q_i}{2} \right\rfloor \qquad \text{EQ \#1}$$

Where, the bottomed bars indicate the value contained therein is rounded down to the nearest integer.

The pretense value ($P_j$) for a particular node 'j' is the sum of all the quora values ($q_i$) of reachable nodes, plus the quora value of the particular node.

In Table 1, pretense values and set states (e.g., Dominant or Yielding) are illustrated for five example partitionings of a three-member node group in which each node is assigned a quora value (q) of 1 and a quorum (Q) of 2.

TABLE 1

Simple Case - Three-member Node Group; $q_{ABC} = 1$ and $Q = 2$

| Partitioning | Pretense Value/Set State | | |
|---|---|---|---|
| (ABC) | 3/Dominant | | |
| (A)(BC) | 1/Yielding | 2/Dominant | |
| (AB)(C) | 2/Dominant | 1/Yielding | |
| (AC)(B) | 2/Dominant | 1/Yielding | |
| (A)(B)(C) | 1/Yielding | 1/Yielding | 1/Yielding |

As it would be ideal under any partitioning scenario to always have no more than one dominant set, it will be appreciated that the quora value assignment represented in Table 1 is sub-optimal as there is a partition set (A)(B)(C) with no dominant partitions.

In Table 2, pretense values and set states are illustrated for the same five example partitionings of a three-member node group, but with a quora assignment of (3, 1, and 1) and a quorum (Q) of 3.

TABLE 2

Simple Case - Three-member Node Group; $q_A = 3$,; $q_B = 1$, and $q_C = 1$ and $Q = 3$

| Partitioning | Pretense Value/Set State | | |
|---|---|---|---|
| (ABC) | 5/Dominant | | |
| (A)(BC) | 3/Dominant | 2/Yielding | |
| (AB)(C) | 4/Dominant | 1/Yielding | |
| (AC)(B) | 4/Dominant | 1/Yielding | |
| (A)(B)(C) | 3/Dominant | 1/Yielding | 1/Yielding |

While the quora value assignment represented in Table 2 produces better overall results than the quora value assignment represented in Table 1, as it results in no partitioning condition without a dominant set, those skilled in the art will appreciate that it is possible for node A to be down, which would essentially reduce the three-member node group to a non-optimal two-member node group (BC) with a pretense value of 2 and a set state of Yielding.

In Table 3, pretense values and set states are illustrated for two example partitionings of a two-member node group with a quora assignment of (1, 1) and a quorum (Q) of 2.

TABLE 3

A Sub-optimal Two-member Node Group: $q_{AB} = 1$ and $Q = 2$

| Partitioning | Pretense Value/Set State | |
|---|---|---|
| (AB) | 2/Dominant | |
| (A)(B) | 1/Yielding | 1/Yielding |

As can be seen, the quora value assignment represented in Table 3 is non-optimal as the partitioning (A)(B) has no dominant set.

In Table 4, pretense values and set states are illustrated for two example partitionings of a two-member node group with a quora assignment of (2, 1) and a quorum (Q) of 2.

TABLE 4

An Optimal Two-member Node Group: $q_A = 2$, $q_B = 1$, and $Q = 2$

| Partitioning | Pretense Value/Set State | |
|---|---|---|
| (AB) | 3/Dominant | |
| (A)(B) | 2/Dominant | 1/Yielding |

As can be seen, the quora value assignment represented in Table 4 is optimal as there are no partitions without a dominant set.

Given the existence of an optimal quora value assignment for a two-member node group, the question arises whether there is an optimal quora value assignment for a three-member node group in which a node failure may occur. In Table 5, a three-member node group is again considered with a quora assignment of (5, 2, and 1) and a quorum (Q) of 5, that also takes into consideration partitioning scenarios in which there is a node failure. In Table 5, the notation ( ) indicates a down node.

TABLE 5

Three-member Node Group: $q_A = 5$,; $q_B = 2$, and $q_C = 1$ and $Q = 5$

| Partitioning | Pretense Value/Set State | | |
|---|---|---|---|
| (ABC) | 8/Dominant | | |
| (A)(BC) | 5/Dominant | 3/Yielding | |
| (AB)(C) | 7/Dominant | 1/Yielding | |
| (AC)(B) | 6/Dominant | 2/Yielding | |
| (A)(B)(C) | 5/Dominant | 2/Yielding | 1/Yielding |
| ( )(BC) | Down | 3/Yielding | |
| ( )(B)(C) | Down | 2/Yielding | 1/Yielding |
| (AC)( ) | 6/Dominant | Down | |
| (A)( )(C) | 5/Dominant | Down | 1/Yielding |
| (AB)( ) | 5/Dominant | Down | |
| (A)(B)( ) | 5/Dominant | 2/Yielding | Down |
| (A)( )( ) | 5/Dominant | Down | Down |
| ( )(B)( ) | Down | 2/Yielding | Down |
| ( )( )(C) | Down | Down | 1/Yielding |

Table 5 illustrates there is no optimal quora value assignment for a node group of three or more nodes. As whenever the dominant node (the one with the highest quora value) is down, a sub-optimal condition exists in which there is no dominant set. See, e.g., partition sets ( )BC), ( )B)(C), ( )(B)( ), and ( )( )(C). As explained further below, an optimistic mitigation technique is generally sufficient to mitigate this condition as it allows yielding sets to continue to operate. Since there is no optimal quora value assignment for a node group of three or more nodes, the quora value assignment techniques described herein seeks to minimize the number of potential partitionings in which there is no dominant set.

Figure 2:
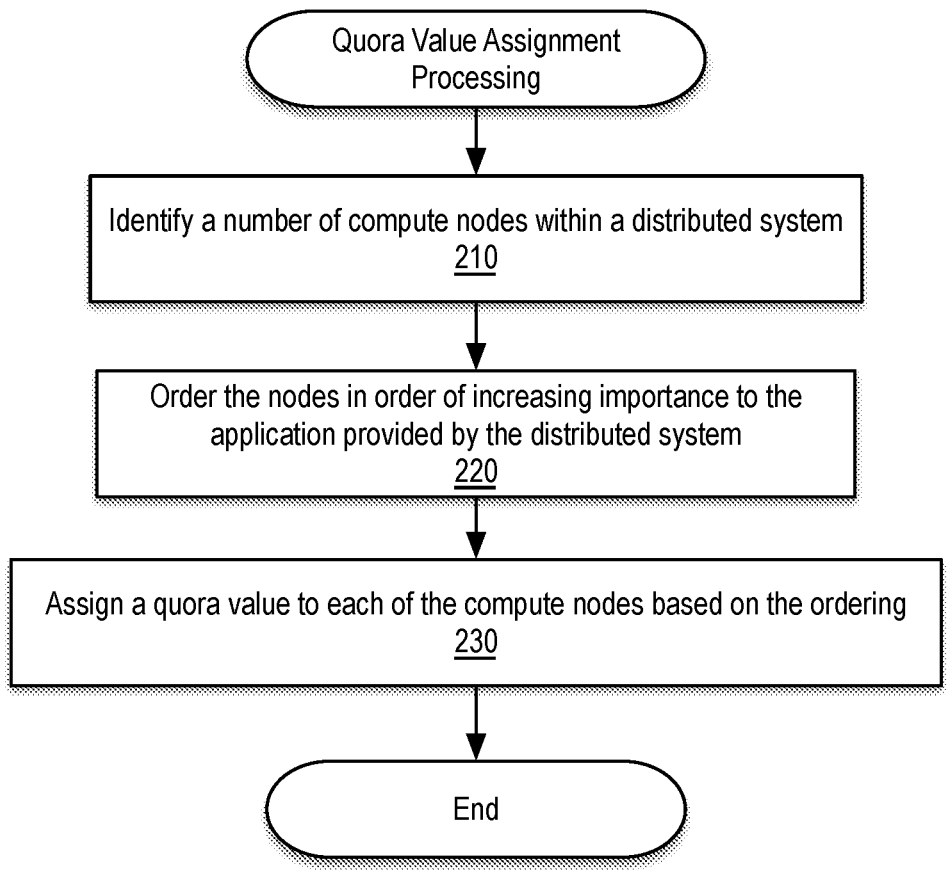
FIG. 2 is a flow diagram illustrating quora value assignment processing in accordance with an example embodiment.

FIG. 2 is a flow diagram illustrating quora value assignment processing in accordance with an example embodiment. In order to maximize service availability during a split-brain condition, for example, in connection with an example pessimistic mitigation operating mode described further below with reference to FIG. 5 or in connection with an example optimistic mitigation operating mode described further below with reference to FIG. 6, it is desirable to assign quora values to the nodes that result in the following characteristics for all possible subset partitionings:

Zero or one dominant sets exist among the partitions. Stated another way, there should not be a partitioning that results in two or more dominant sets.

Minimization or elimination of the number of zero-dominant-set partitionings. As when there are zero dominant sets, the service is down (when using pessimistic mitigation). Stated another way, the quora value assignment approach should minimize or eliminate situations in which all sets of nodes resulting from a partitioning are yielding sets (i.e., their respective pretense values are less than the quorum).

According to one embodiment, quora value assignment processing is performed by a computer system (e.g., a workstation of an administrator of a distributed computer system 100) separate and apart from the nodes (e.g., server nodes 120a-x) participating in the distributed computer system 100. Alternatively, one of the nodes of the distributed computer system may perform the quora value assignment processing.

At block 210, a number of compute nodes within a distributed system are identified. This may be achieved by reading configuration information associated with the distributed system or the administrator may manually input this information.

At block 220, the nodes are ordered by increasing importance to the application provided by the distributed system. According to one embodiment, a sorted list of nodes may be created in which the first node in the list is the least important to the application and the last node in the list is the most important to the application based on, for example, one or more of compute capacity, compute performance, system or environment robustness, such as availability of power or communications, or transaction rates to the node(s).

At block 230, a quora value is assigned to each of the compute nodes based on the ordering. According to one embodiment, the generation of good quora values can be achieved by assigning the sum of the quora values of the prior nodes (1 to n−1) to the current node (n), plus either 1 or the present value of n. This approach can be generalized by the following quora value generator equation:

$$q_{n+1} = \Sigma(q_1 \ldots q_n) + (1 | n) \qquad \text{EQ \#2}$$

The simplest case is to use 1 as the adder in EQ #2 in which case the generator equation reduces to:

$$q_n = 2^n \qquad \text{EQ \#3}$$

Based on EQ #3, for a five node set, the values of q would be 1, 2, 4, 8, and 16.

Figure 3:
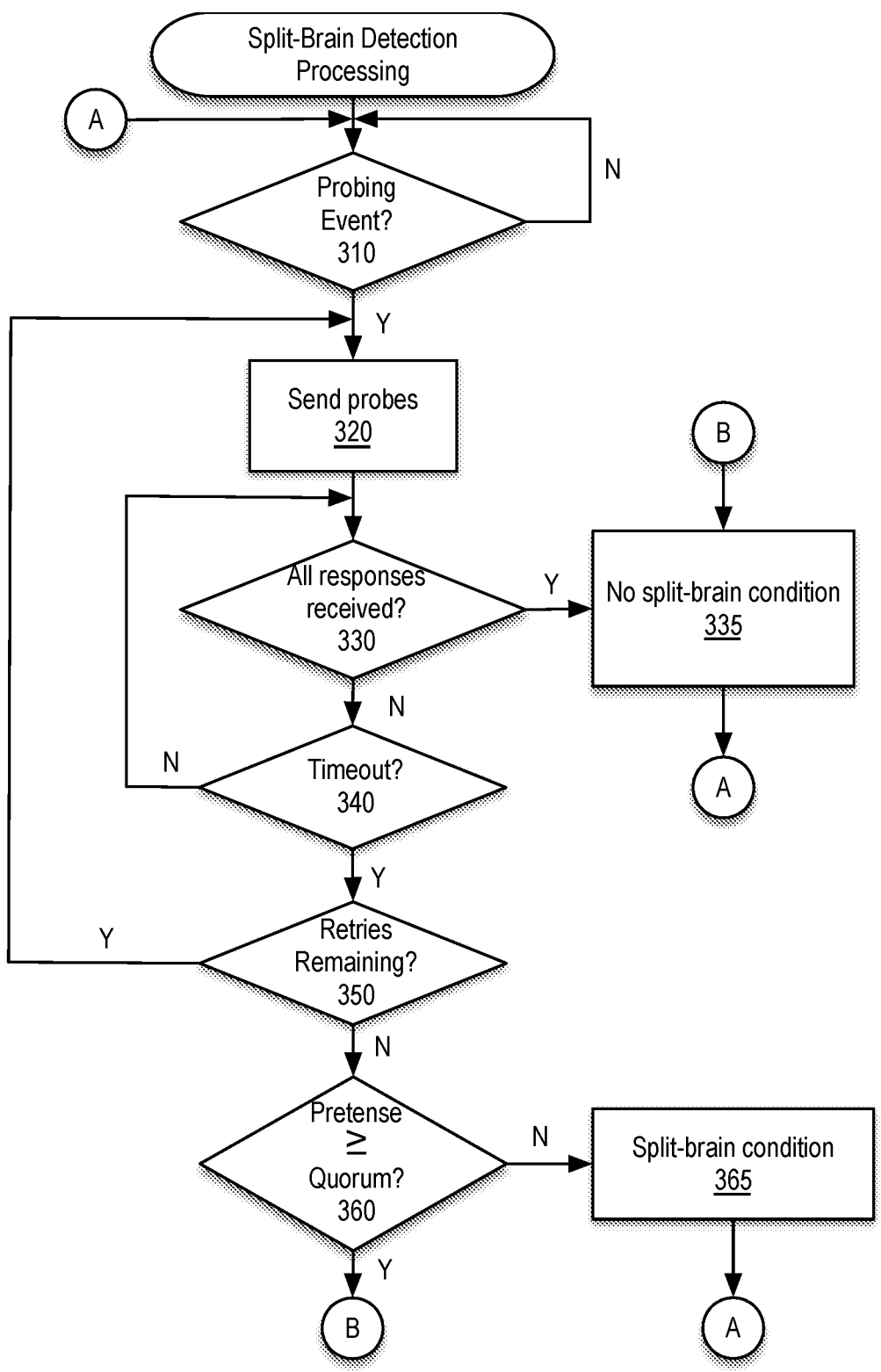
FIG. 3 is a flow diagram illustrating split-brain detection processing in accordance with an example embodiment.

FIG. 3 is a flow diagram illustrating split-brain detection processing in accordance with an example embodiment. As those skilled in the art will appreciate, the mere fact that a node of a node group (e.g., distributed computer system 100) is unreachable does not in itself indicate a split-brain condition. For example, the peer node may be down, but there may be no partitioning of nodes of the node group into multiple islands. As such, what actually matters is if the current node is a member of the dominant set. In the context of the present example, a particular node is part of the dominant set when the pretense value for the particular node is greater than or equal to the quorum; otherwise, the particular node is in a yielding set, and is considered to be in a split-brain condition, even if it is actually down.

According to one embodiment, each node in the node group performs periodic and/or on-demand reachability or connectivity probes to detect a split-brain condition. Those skilled in the art will appreciate there are a variety of methods to probe reachability of other nodes in the node group. Without limitation and solely for completeness, an example approach is now described.

At decision block 310, it is determined whether a probing event has occurred. Depending upon the particular implementation, a probing event may be triggered periodically responsive to expiration of a timer and/or on-demand, for example, depending upon the needs of the application at issue. If a probing event has been triggered, then processing continues with block 320; otherwise, split-brain detection processing loops back to decision block 310 to continue the periodic or on-demand evaluation. Those skilled in the art will appreciate consideration should be given to the impact of these probes on the application or service provided by the node group by, for example, selecting a probing interval that does not negatively impact the ability of the application to process requests from clients.

At block 320, probes are sent. According to one embodiment, the node at issue sends a probe to each of the other nodes in the node group. For example, one potential approach for probing reachability is to send a Transmission Control Protocol (TCP) synchronize (SYN) packet to a peer node on a non-listening, well-known port (e.g., port number 2). As those skilled in the art will appreciate, the probing technique should consider the likelihood of firewalls or routers that might filter the probe port, or those that return TCP reset (RST) packets for blocked ports. If this is likely, then the reachability probe should become instead a connectivity probe using the same inter-node communications port or protocol that is used for synchronization of the shared state. For example, a connect (2) to the port on the peer node may be attempted. If successful, or if ECONNREFUSED is returned, then the peer node may be considered reachable (even though it may not be connectable).

At decision block 330, it is determined whether all responses have been received from the peer nodes in the node group. According to one embodiment, responsive to receiving a probe packet (e.g., a TCP SYN packet), a node responds with a predefined or configurable packet acknowledging receipt of the reachability probe. For example, nodes may respond to the querying node with an acknowledgement (ACK), such as a TCP SYN-ACK packet or a TCP reset (RST) packet. If all responses have been received, then processing continues with block 335; otherwise, processing branches to decision block 340.

At block 335, responses to the probes from the node at issue have been received from all of the peer nodes in the node group, therefore, it is determined no split-brain condition exists and processing loops back to decision block 310.

At decision block 340, it is determined whether a period for receiving probe responses has timed out. Non-limiting examples of timeout intervals include 3, 6, 12, and 24 seconds. If the timeout interval has expired and there remain one or more outstanding probing requests for which a response has not been received, then processing continues with decision block 350; otherwise, time remains for responses to be received, processing loops back to decision block 330.

At decision block 350, it is determined whether any retries remain. Depending upon the particular implementation, a predefined or configurable number of probe retries (e.g., zero to four) may be allowed before considering a peer node unreachable. If any retries remain, processing loops back to block 320 where the unresponsive nodes may be probed again; otherwise, if there are no retries left, then processing continues with decision block 360.

At decision block 360, it is determined whether the pretense value for the node at issue is greater than or equal to the quorum. As it is difficult to distinguish a condition in which a nodes is down from a split-brain condition, in one embodiment, the split-brain detection processing may address this by assuming the existence of a split-brain condition when the node at issue determines it is part of a yielding set.

According to one embodiment, each node is configured, for example, via a configuration file with information regarding the quora values of the peer nodes in the node group. Alternatively, nodes may include their respective quora values in their probe responses. In one embodiment, the pretense value for the node at issue is calculated by summing the quora values of the reachable peer nodes (e.g., those from which a probe response was timely received) and adding the quora value of the node at issue. If the pretense value of the node at issue is greater than or equal to the quorum (meaning the node at issue is part of a dominant set), then processing continues with block 335; otherwise, if the pretense value of the node at issue is less than the quorum (meaning the node at issue is part of a yielding set), then processing continues with block 365.

At block 365, the node at issue recognizes the split-brain condition and may loop back to decision block 310 to determine when to probe again. According to one embodiment, upon detecting the split-brain condition the node may perform mitigation processing. An example of mitigation processing is described below with reference to FIG. 4.

Figure 4:
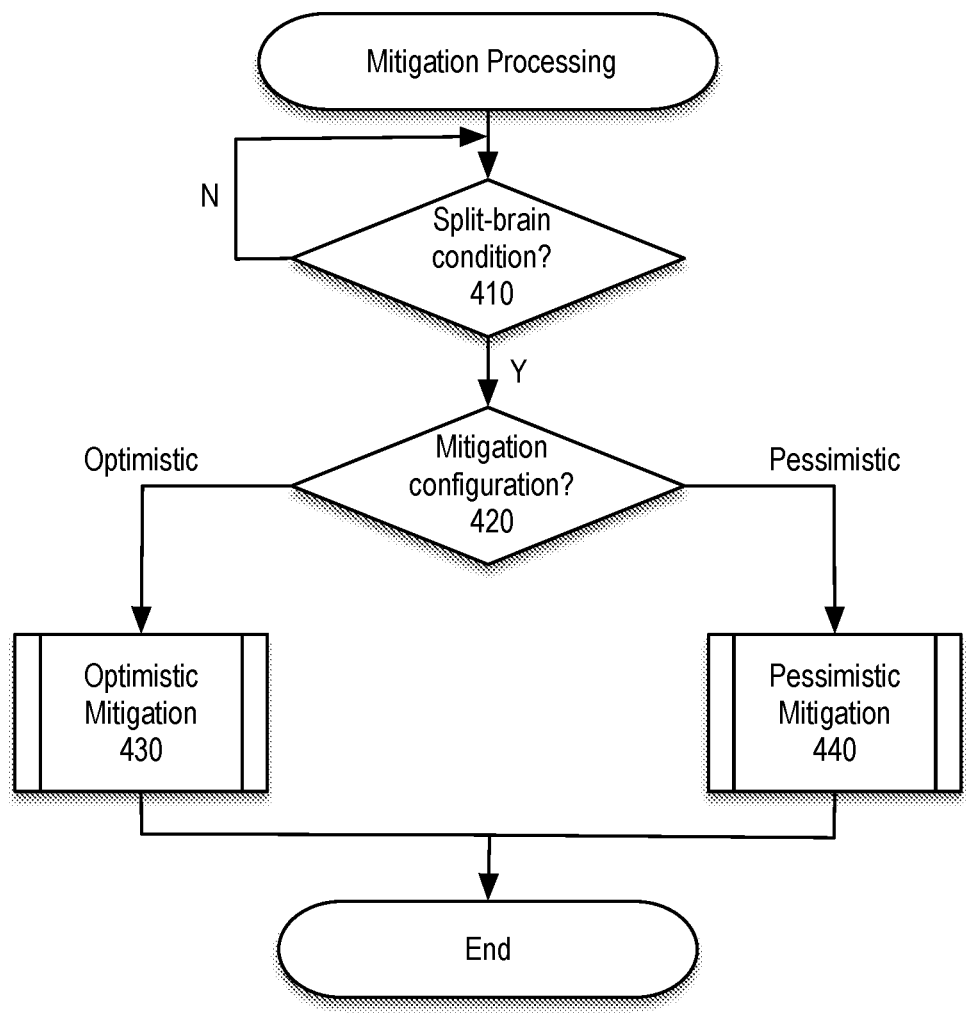
FIG. 4 is a flow diagram illustrating high-level mitigation processing in accordance with an example embodiment.

FIG. 4 is a flow diagram illustrating high-level mitigation processing in accordance with an example embodiment. At decision block 410, a node of a distributed system (e.g., distributed computer system 100) determines whether a split-brain condition exists. According to one embodiment, each node of the distributed system may periodically perform a split-brain detection process, for example, as described above with reference to FIG. 3. If the split-brain condition exists, then mitigation processing continues with decision block 420; otherwise, processing loops back to decision block 410.

At decision block 420, a mitigation configuration may be evaluated. According to one embodiment, the nodes may be configured, for example, via a configuration file or from a management or administrative computer system or node to operate in accordance with one of multiple mitigation modes. If the mitigation configuration indicates the node is to operate in accordance with an optimistic mitigation mode, then processing continues with block 430; otherwise, if the mitigation configuration indicates the node is to operate in accordance with a pessimistic mitigation mode, then processing continues with block 440.

At block 430, the node performs optimistic mitigation processing. According to one embodiment, the optimistic mitigation processing allows all operational nodes to continue processing requests that may modify the shared state. A non-limiting example of optimistic mitigation processing that may be performed at block 430 is described further below with reference to FIG. 6.

At block 440, the node performs pessimistic mitigation processing. According to one embodiment, the pessimistic mitigation processing allows only those nodes that are part of the dominant set to accept client requests that modify the shared state. In such an embodiment, the nodes in a yielding set may be precluded from performing any action that modifies the shared state. A non-limiting example of pessimistic mitigation processing that may be performed at block 440 is described further below with reference to FIG. 5.

While in the context of the present example, mitigation processing involves checking configuration information to determine which of multiple mitigation approaches to perform, depending upon the particular implementation, it may be that only a single, preconfigured mitigation approach is available. Alternatively, information regarding the nature of the application or service provided by the distributed system may be taken into consideration to determine the mitigation technique to be applied. For example, if the application is desired to be highly available, then the optimistic mitigation approach may be performed to allow all operational nodes of the distributed system to continue servicing client requests; otherwise, the pessimistic mitigation approach may be performed.

Figure 5:
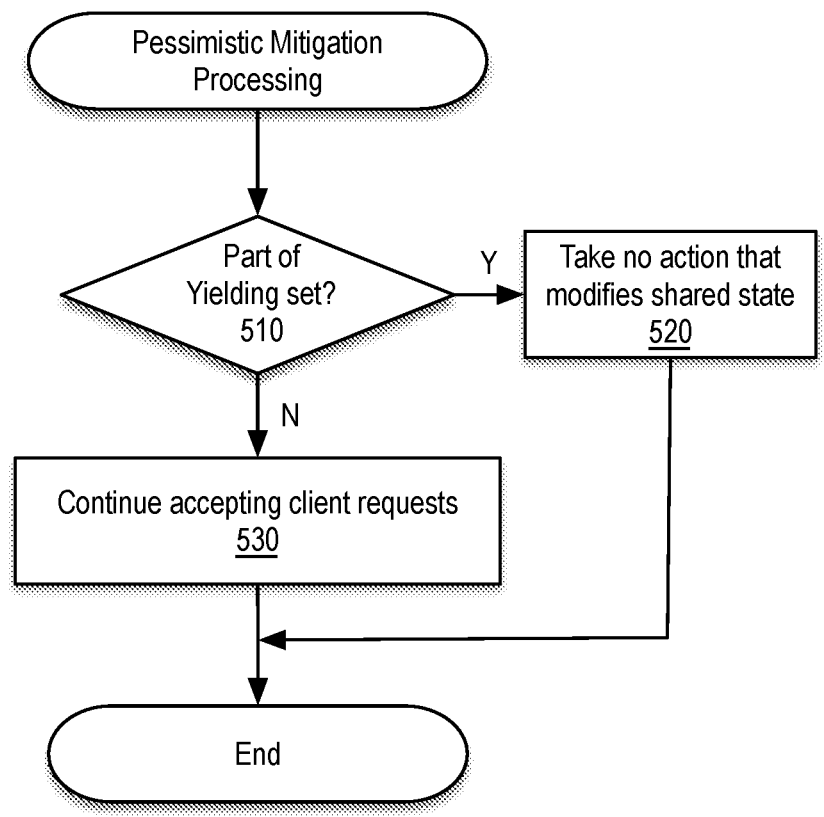
FIG. 5 is a flow diagram illustrating pessimistic mitigation processing in accordance with an example embodiment.

FIG. 5 is a flow diagram illustrating pessimistic mitigation processing in accordance with an example embodiment. At decision block 510, the node at issue determines whether it is part of a yielding set. If the node at issue is part of a yielding set, then processing continues with block 520; otherwise, processing continues with block 530. According to one embodiment, this determination involves (i) calculating the pretense value of the node, for example, by summing the quora values of the reachable nodes and adding the quora value of the node at issue and (ii) comparing the pretense value to the quorum. In one embodiment, when the pretense value is greater than or equal to the quorum, the node at issue is part of the dominant set and when the pretense value is less than the quorum, the node at issue is part of a yielding set.

At block 520, the node at issue takes no action that modifies the shared state of the distributed system. According to one embodiment, this involves the node at issue no longer listening on the network port on which client requests are received so as to trigger a load-balancer fail-over (if used). Alternatively, the node at issue may respond with a temporary redirect to some other node not in this yielding set, or the node at issue may perform a dynamic domain name system (DNS) update to remove itself from the advertised service record(s), or the clients may be implemented such that they perform client-based resource selection and can perform the fail-over themselves. In this manner, no damage (e.g., creation of inconsistent state) will be caused by those nodes associated with one or more yielding sets.

At block 530, those of the nodes that are part of the dominant set continue to accept client requests and may continue to modify the shared state.

According to one embodiment, when split-brain detection processing indicates a yielding node is now part of the dominant set (e.g., block 335 of FIG. 3), then a traditional state-recovery synchronization technique may be used.

Figure 6:
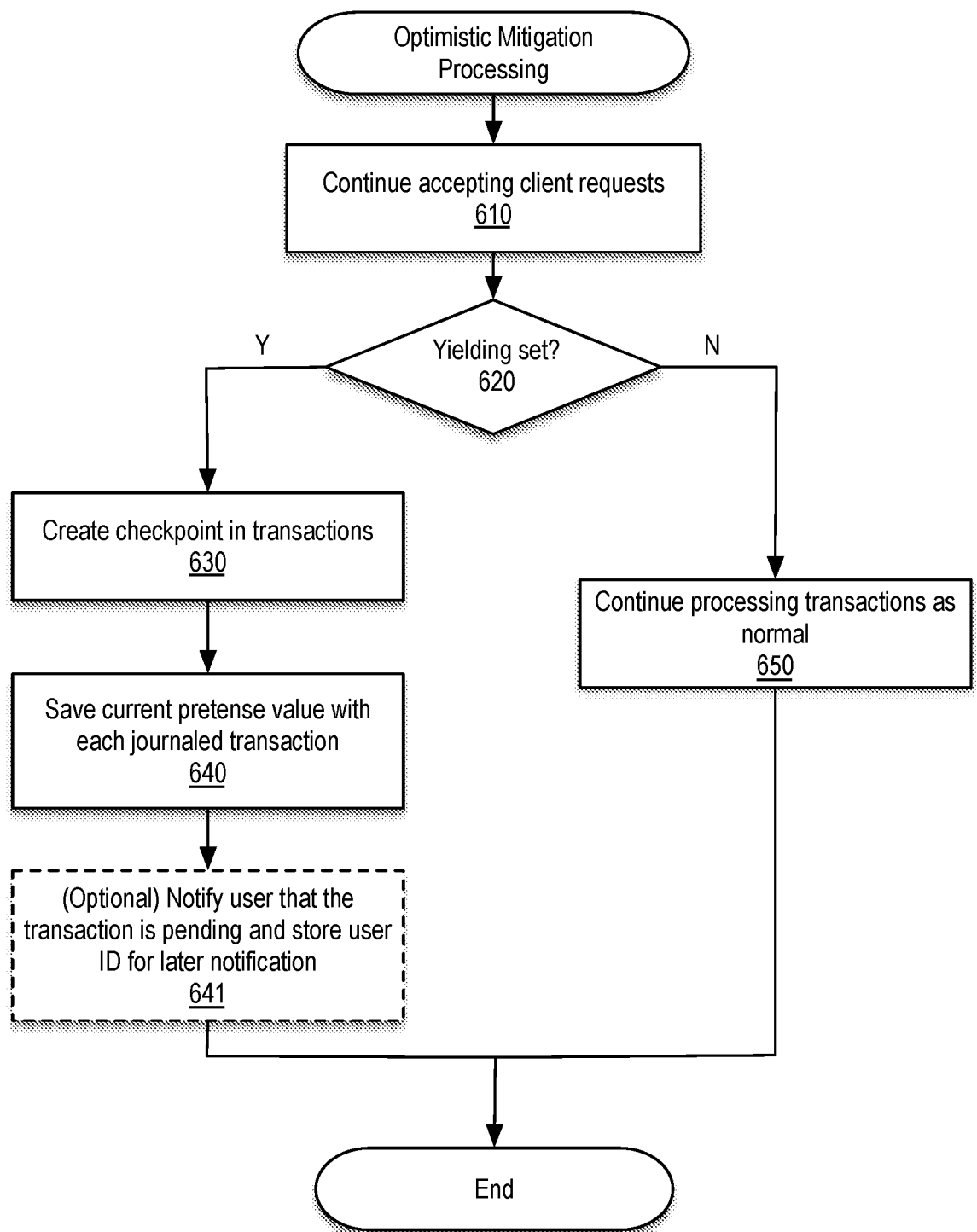
FIG. 6 is a flow diagram illustrating optimistic mitigation processing in accordance with an example embodiment.

FIG. 6 is a flow diagram illustrating optimistic mitigation processing in accordance with an example embodiment. At block 620, all operational nodes continue to accept client requests. According to one embodiment, regardless of their state of being part of a yielding set or part of the dominant set, any node receiving a client request is permitted to continue accepting and processing such requests and modifying the shared state, optionally notifying users that their transactions are pending. In one embodiment, when the split-brain condition is resolved and the nodes that were formerly part of the yielding set will perform a conflict resolution process to attempt to resolve any inconsistencies that may have been created during the split-brain condition. An example of the conflict resolution processing that may be performed by the former yielding nodes is described with reference to FIG. 7.

At decision block 620, it is determined whether the node at issue is in the yielding set. If the node is in the yielding set, then processing continues with block 630; otherwise, processing continues with block 650. According to one embodiment, this determination involves (i) calculating the pretense value of the node, for example, by summing the quora values of the reachable nodes and adding the quora value of the node at issue and (ii) comparing the pretense value to the quorum. In one embodiment, when the pretense value is greater than or equal to the quorum, the node at issue is part of the dominant set and when the pretense value is less than the quorum, the node at issue is part of a yielding set.

At block 630, nodes that are part of the yielding set create a checkpoint in their respective transactions. For example, the checkpoint may represent a point before which local databases (e.g., databases 121*a-x*) used by the respective nodes (e.g., server nodes 120*a-x*) were known to be in a consistent state, and all the transactions were committed.

At block 640, the pretense value is saved with each journaled transaction. As noted above the pretense value may be calculated by summing the quora values of the reachable nodes and adding the quora value of the node at issue. In one embodiment, transaction journaling is performed to log updates that are made to local databases of yielding nodes to facilitate performance of a conflict resolution process once the split-brain condition is resolved. For example, a journal file may be used to record information including the pretense value, a timestamp, and an identifier associated with the requesting client for each database update performed during the split-brain condition.

In one embodiment, at (optional) block 641, yielding nodes may notify users of a potential for conflict, for example, by indicating their transaction is "pending" and/or prompt for alternative choices (e.g., a different concert seat) should their primary choice(s) be deemed unavailable when the split-brain condition is resolved. In addition, an identifier for the user (e.g., a mobile phone number) may be stored for the user to allow the user to be notified regarding the final status of the "pending" transaction.

At block 650, nodes that are part of the dominant set continue processing transactions as normal including modifying the shared state as needed.

Figure 7:
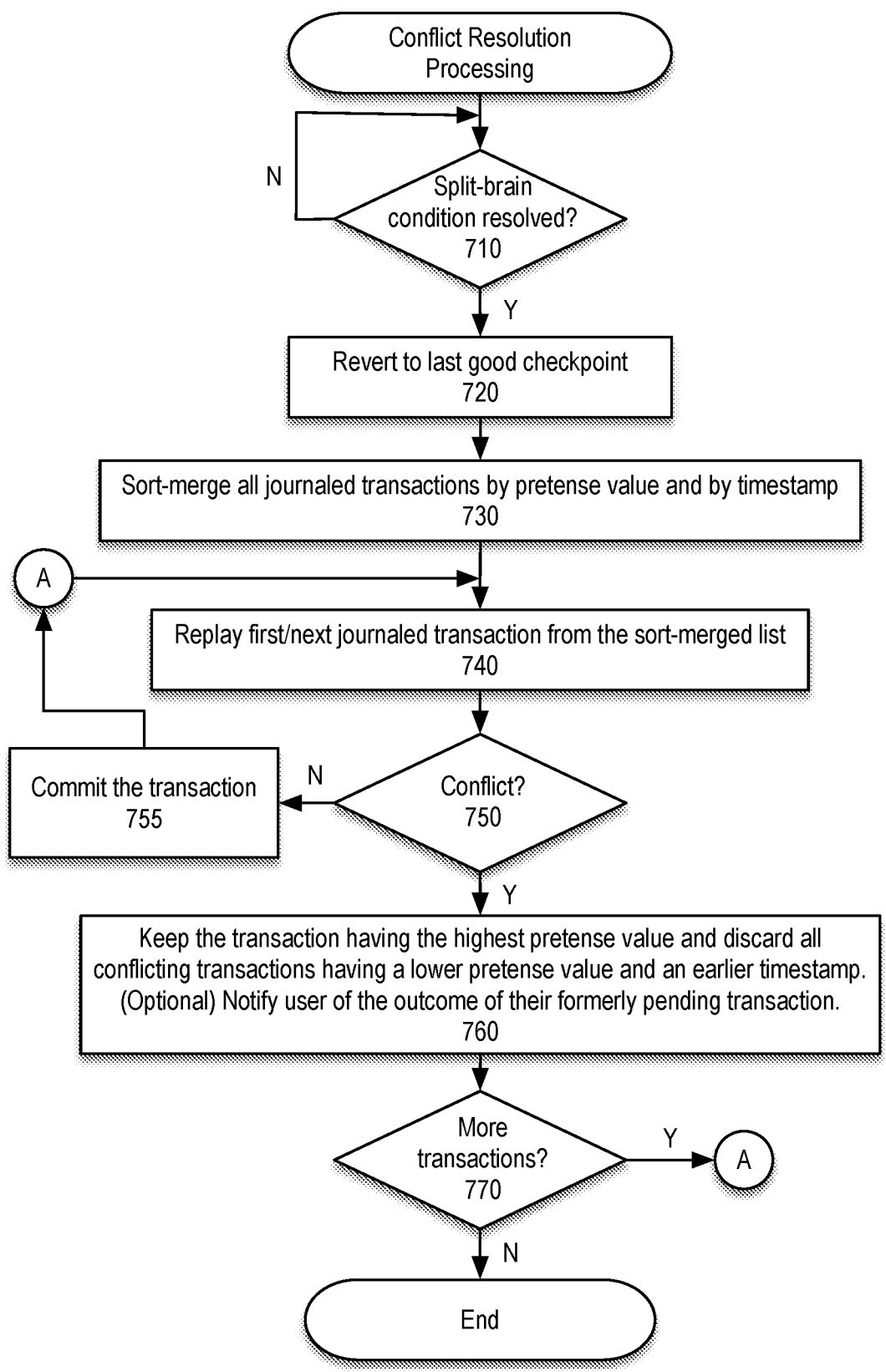
FIG. 7 is a flow diagram illustrating conflict resolution processing in accordance with an example embodiment.

FIG. 7 is a flow diagram illustrating conflict resolution processing in accordance with an example embodiment. At decision block 710, a yielding node of a distributed system (e.g., distributed computer system 100) determines whether a split-brain condition has been resolved. According to one embodiment, the yielding nodes of the distributed system may periodically perform a split-brain detection process, for example, as described above with reference to FIG. 3. If the split-brain condition previously existed and no longer exists (e.g., as reflected by block 335 of FIG. 3), then processing continues with block 720; otherwise, processing loops back to decision block 710.

At block 720, the yielding node at issue reverts to the last good checkpoint. According to one embodiment, this will be the checkpoint established at block 610 of FIG. 6 at the time optimistic mitigation processing started.

At block 730, the journaled transactions performed subsequent to the checkpoint are sort-merged by pretense value and by timestamp. According to one embodiment, this involves the yielding node at issue fetching the journals from each of the other nodes and sort-merging them with its own journal for the same time period.

At block 740, the first journaled transaction from the sort-merged list of transactions is replayed.

At decision block 750, it is determined whether the replay of the transaction at block 740 is in conflict with any other transactions in the sort-merged list of transactions. If no conflicts exist, then processing continues with block 755; otherwise, processing continues with block 760.

At block 755, as there are no conflicts with the journaled transaction at issue, it is committed.

At block 760, as there are one or more conflicts with the journaled transaction at issue, the transaction having the highest pretense value is retained and all conflicting transactions having a lower pretense value and an earlier timestamp are discarded. According to one embodiment, users may be optionally notified regarding the status of transactions that were performed (tentatively accepted or marked as "pending") during the split-brain condition. For example, a user that was warned of a potential conflict during the split-brain condition may be notified (e.g., via a text message) that a transaction that was previously tentatively accepted during the split-brain condition has been reverted or has been committed as the case may be.

At decision block 770, it is determined if there are more transactions to be considered. If so, then processing loops back to block 740 to replay the next journaled transaction from the sort-merged list; otherwise conflict resolution processing is complete.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Example Scenarios

For purposes of illustrating concrete examples of the pessimistic and optimistic mitigation approaches described herein, some non-limiting example use cases will now be described.

Example #1—Content Delivery Service

In one particular usage scenario a content delivery service may be used to send custom firmware or other software updates to devices in the field. The content delivery service may be implemented by multiple, geographically distributed datacenters. Product development groups of an enterprise may publish custom content (the shared state) to these datacenter sites tens, hundreds, or thousands of times per day. In order to ensure the devices in the field have reliable access and are provided with the correct firmware, the content maintained by each of the distributed datacenters synchronized between the locations. If any site were to split into an island as a result of a network partitioning event, the nodes in that island determine if they are part of a dominant or yielding set. For example, the nodes each calculate their pretense value, P, and compare it to the quorum (Q). In this example, nodes that are in a yielding set implement a pessimistic mitigation approach and stop serving content, triggering device clients to fail-over to dominant nodes. The dominant nodes continue to process requests and serve content to clients. Once the split-brain condition is resolved, the yielding nodes may force a full content re-synchronization and then resume content delivery to clients.

Example #2—Bank Account Transfers

In this example, it is assumed a distributed system (e.g., distributed computer system 100) provides a distributed banking application, with node A (having a quora value of 1) in Denver, Colo. and node B in San Jose, Calif. (having a quora value of 2). In this example, the distributed banking application is desired to be highly available, so it is configured to use an optimistic mitigation technique. In the context of the distributed banking application a conflict is defined as an update to the same record during the split-brain condition. The distributed banking application does not use the typical time-based "first one wins" or "later one overrides" resolution technique. Rather, the distributed banking application uses the conflict resolution process as described herein with reference to FIG. 7. Assume, two clients, a husband who has traveled to Denver, and a wife in San Jose, want to transfer money from their shared account. They both check their account balance at approximately the same time and see the balance is $1,000.00. Just then, the network between Denver and San Jose goes down. The Denver node notes it has become a yielding node, so it checkpoints the database and records the time. The San Jose node sees that it is part of the dominant set, so it proceeds normally. Husband in Denver performs an account transfer for $700.00, which is marked in the database as "pending", with the husband's ID, and the husband is informed that the transaction is pending and he will be notified later. The Wife in San Jose also performs a transfer, but for $850.00, which goes thru normally. Ten minutes later, the network is restored. The Denver node, formerly a yielding node, detects that it is no longer in a split-brain condition, so it begins the conflict resolution process, by fetching the last ten minutes of the San Jose node's journal, sort-merges the San Jose node's journal with its own journal for the same time period, and replays the transactions. The husband/wife transactions are in conflict, but as the wife's transaction has a higher pretense value, her transaction is applied while the husband's transaction is reverted. The husband may be notified, for example, via a text message that his transaction did not occur. All other non-conflicting San Jose transactions are applied by the Denver node.

Embodiments described herein may be provided as a computer program product, which may include a non-transitory machine-readable storage medium tangibly embodying thereon instructions, which may be used to program a computer (or other electronic devices) to perform a process (including, e.g., processes described in FIGS. 2-7). The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 8:
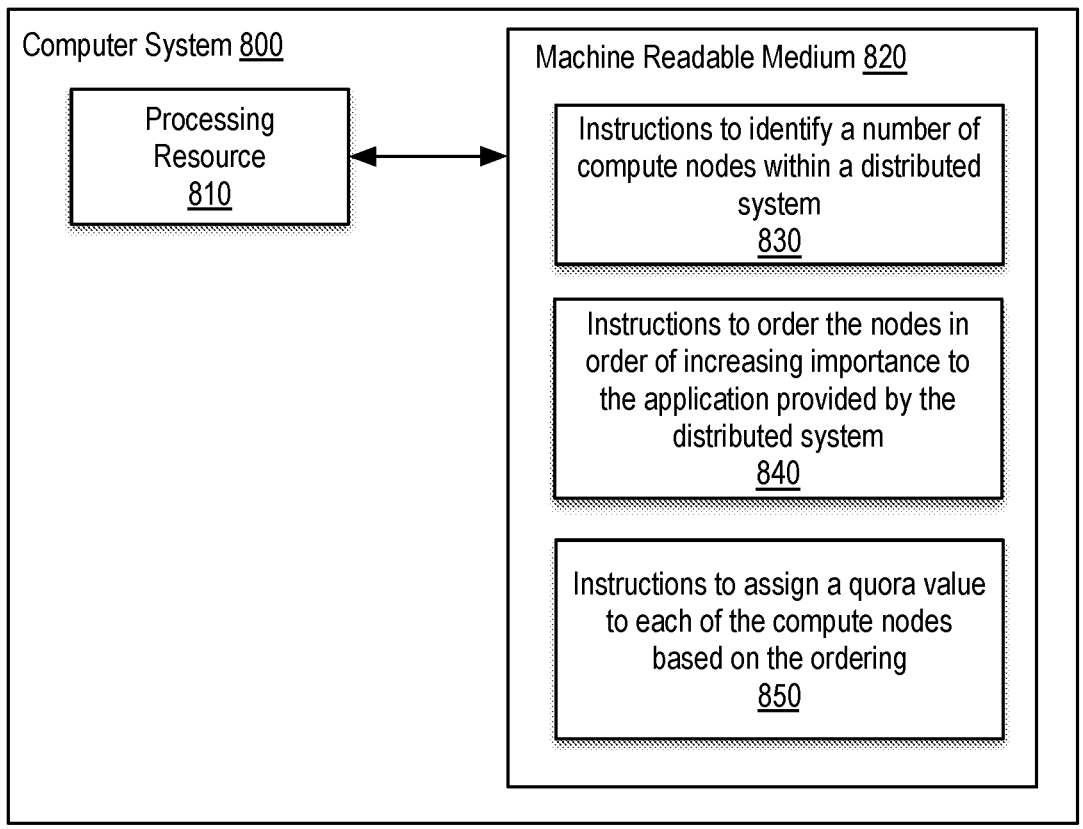
FIG. 8 is a block diagram of a computer system that may be operated by an administrator of a distributed computing system in accordance with an example embodiment.

FIG. 8 is a block diagram of a computer system 800 that may be operated by an administrator of a distributed computing system in accordance with an example embodiment. In the example illustrated by FIG. 8, computer system 800 includes a processing resource 810 coupled to a non-transitory, machine readable medium 820 encoded with instructions to perform quora value selection and assignment to nodes of a distributed system. The processing resource 810 may include a microcontroller, a microprocessor, central processing unit core(s), an ASIC, an FPGA, and/or other hardware device suitable for retrieval and/or execution of instructions from the machine readable medium 820 to perform the functions related to various examples described herein. Additionally or alternatively, the processing resource 810 may include electronic circuitry for performing the functionality of the instructions described herein.

The machine readable medium 820 may be any medium suitable for storing executable instructions. Non-limiting examples of machine readable medium 820 include RAM, ROM, EEPROM, flash memory, a hard disk drive, an optical disc, or the like. The machine readable medium 820 may be disposed within the computer system 800, as shown in FIG. 8, in which case the executable instructions may be deemed "installed" or "embedded" on the computer system 800. Alternatively, the machine readable medium 820 may be a portable (e.g., external) storage medium, and may be part of an "installation package." The instructions stored on the machine readable medium 820 may be useful for implementing at least part of the methods described herein.

In the context of the present example, the machine readable medium 820 is encoded with a set of executable instructions 830-850. It should be understood that part or all of the executable instructions and/or electronic circuits included within one block may, in alternate implementations, be included in a different block shown in the figures or in a different block not shown.

Instructions 830, upon execution, cause the processing resource 810 to identify a number of compute nodes within a distributed system. In one embodiment, instructions 830 may correspond generally to instructions for performing block 210 of FIG. 2.

Instructions 840, upon execution, cause the processing resource 810 to order the nodes in order of increasing importance to the application provided by the distributed system. In one embodiment, instructions 840 may correspond generally to instructions for performing block 220 of FIG. 2.

Instructions 850, upon execution, cause the processing resource 810 to assign a quora value to each of the compute nodes based on the ordering. In one embodiment, instructions 850 may correspond generally to instructions for performing the block 230 of FIG. 2.

Figure 9:
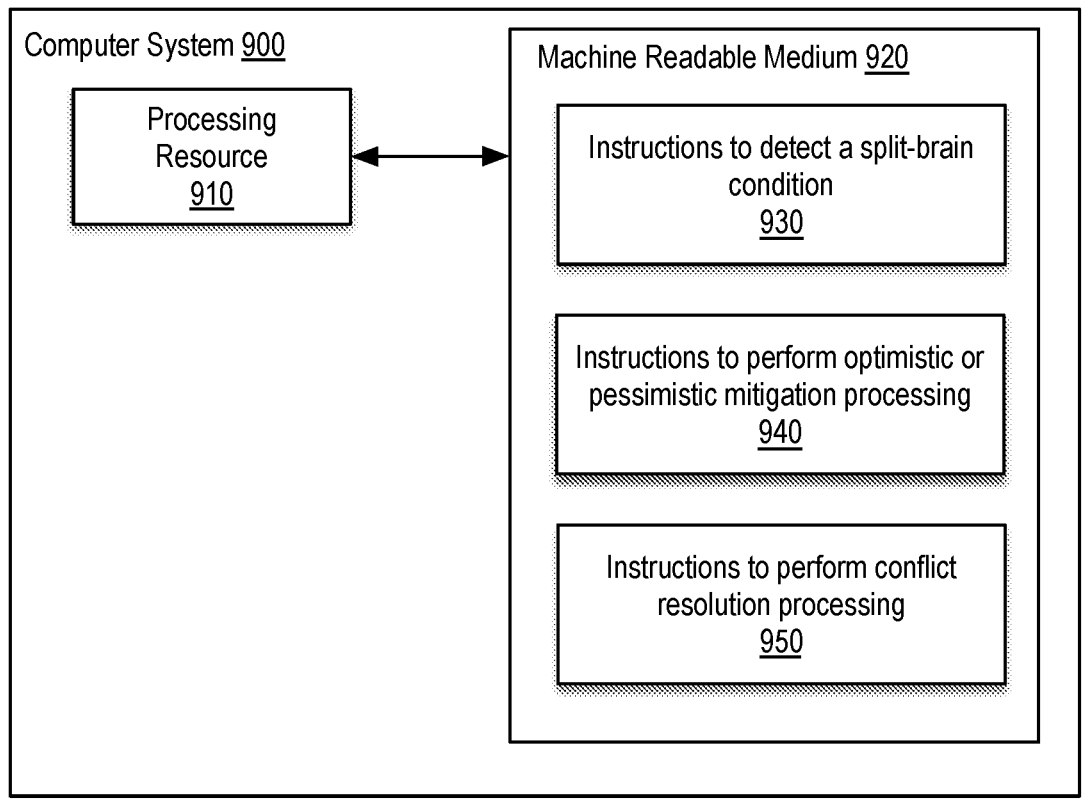
FIG. 9 is a block diagram of a computer system that may represent one of the nodes of a distributed computing system in accordance with an example embodiment.

FIG. 9 is a block diagram of a computer system 900 that may represent one of the nodes of a distributed computing system in accordance with an example embodiment. In the example illustrated by FIG. 9, computer system 900 includes a processing resource 910 coupled to a non-transitory, machine readable medium 920 encoded with instructions to identify the existence of a split-brain condition in a distributed network of compute notes and mitigate shared-state damage during the split-brain condition. The processing resource 910 may include a microcontroller, a microprocessor, central processing unit core(s), an ASIC, an FPGA, and/or other hardware device suitable for retrieval and/or execution of instructions from the machine readable medium 920 to perform the functions related to various examples described herein. Additionally or alternatively, the processing resource 910 may include electronic circuitry for performing the functionality of the instructions described herein.

The machine readable medium 920 may be any medium suitable for storing executable instructions. Non-limiting examples of machine readable medium 920 include RAM, ROM, EEPROM, flash memory, a hard disk drive, an optical disc, or the like. The machine readable medium 920 may be disposed within the computer system 900, as shown in FIG. 9, in which case the executable instructions may be deemed "installed" or "embedded" on the computer system 900. Alternatively, the machine readable medium 920 may be a portable (e.g., external) storage medium, and may be part of an "installation package." The instructions stored on the machine readable medium 920 may be useful for implementing at least part of the methods described herein.

In the context of the present example, the machine readable medium 920 is encoded with a set of executable instructions 930-950. It should be understood that part or all of the executable instructions and/or electronic circuits included within one block may, in alternate implementations, be included in a different block shown in the figures or in a different block not shown.

Instructions 930, upon execution, cause the processing resource 910 to detect a split-bran condition. In one embodiment, instructions 930 may correspond generally to instructions for performing blocks 310-360 of FIG. 3.

Instructions 940, upon execution, cause the processing resource 910 to perform optimistic or pessimistic mitigation processing. In one embodiment, instructions 940 may correspond generally to instructions for performing blocks 410-440 of FIG. 4, and blocks 510-530 of FIG. 5 or blocks 610-630 of FIG. 6.

Instructions 950, upon execution, cause the processing resource 910 to perform conflict resolution processing. In one embodiment, instructions 950 may correspond generally to instructions for performing the blocks 710-70 of FIG. 7.

While computer systems 800 and 900 of FIGS. 8 and 9 are shown and described separately in the above examples, in some embodiments, they may be one in the same.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A method comprising:
identifying a number, N, of a plurality of compute nodes within a distributed computing system that runs an application, wherein during normal operation of the distributed computing system a unified state is maintained by synchronizing shared state information among the plurality of compute nodes;
ordering the plurality of compute nodes in order of increasing importance to the application from 1 to N, the importance to the application being based on one or more of compute capacity, compute performance, system or environment robustness of a compute node;
assigning a quora value, $q_n$, to each of the plurality of compute nodes in accordance with the ordering, wherein $q_1=1$ and each subsequent quora value, $q_{n+1}$, is a sum of all prior quora values, $q_1$ to $q_n$, plus either 1 or a current value of n;
determining, by a node of the plurality of compute nodes, existence of a split-brain condition; and
performing a mitigation approach,
wherein said determining, by a node of the plurality of compute nodes, existence of a split-brain condition, comprises:
determining, by the node, which of the plurality of compute nodes are reachable by the node by probing all other nodes of the plurality of compute nodes;
dynamically determining, by the node, a current pretense value of the node, wherein the current pretense value is a sum of all quora values of a subset of the plurality of compute nodes that are currently reachable by the node, plus the quora value of the compute node; and
when the current pretense value is less than a quorum for the distributed computing system, recognizing the existence of the split-brain condition.

2. The method of claim 1, further comprising determining by a particular node of the plurality of compute nodes whether the particular node is part of a dominant set of the plurality of compute nodes or part of a yielding set of the plurality of compute nodes.

3. The method of claim 1, further comprising responsive to a result of said determining, by a node of the plurality of compute nodes, existence of a split-brain condition being affirmative, discontinuing, by the node, further processing of transactions relating to the application.

4. The method of claim 1, further comprising responsive to a result of said determining, by a node of the plurality of compute nodes, existence of a split-brain condition being affirmative, performing an optimistic mitigation approach by:
creating, by the node, a checkpoint; and
continuing, by the node, processing of transactions relating to the application, including journaling of the transactions by persisting a current pretense value of the node with each of the transactions, and optionally including an identity of a user causing the transaction, and optionally notifying the user that the transaction is pending a future mitigation.

5. The method of claim 4, further comprising responsive to resolution of the split-brain condition, resolving, by the node, any conflicting transactions of the journaled transactions by:
reverting to the checkpoint;
retrieving journals from other nodes of the plurality of compute nodes;
sort-merging transactions performed subsequent to the checkpoint;
replaying the sort-merged transactions;
when said replaying identifies conflicting transactions for a particular record, retaining a first transaction of the conflicting transactions having a highest pretense value and discarding a second transaction of the conflicting transactions having a lower pretense value and an earlier timestamp; and
when said replaying does not identify any conflicting transactions for a particular transaction associated with the particular record, then committing the particular transaction.

6. The method of claim 1, wherein ordering the plurality of compute nodes in order of increasing importance to the application from 1 to N comprises generating a sorted list in which a first compute node in the list is of least importance to the application and a last compute node in the list is of greatest importance to the application.

7. The method of claim 1, wherein identifying a number, N, of a plurality of compute nodes within a distributed computing system that runs an application comprises receiving first configuration information associated with the distributed system.

8. The method of claim 1, wherein identifying a number, N, of a plurality of compute nodes within a distributed computing system that runs an application comprises receiving first configuration information associated with the distributed system.

9. A non-transitory machine readable medium storing instructions executable by a processing resource of a computer system, the non-transitory machine readable medium comprising instructions to:
identify a number, N, of a plurality of compute nodes within a distributed computing system that runs an application, wherein during normal operation of the distributed computing system a unified state is maintained by synchronizing shared state information among the plurality of compute nodes;
order the plurality of compute nodes in order of increasing importance to the application from 1 to N, the importance to the application being based on one or more of compute capacity, compute performance, system or environment robustness of a compute node;
assign a quora value, $q_n$, to each of the plurality of compute nodes in accordance with the ordering, wherein $q_1=1$ and each subsequent quora value, $q_{n+1}$, is a sum of all prior quora values, $q_1$ to $q_n$, plus either 1 or a current value of n;
determine, by a node of the plurality of compute nodes, existence of a split-brain condition; and
perform a mitigation approach,
wherein the determination regarding the existence of the split-brain condition comprises instructions to:
determine, by the node, which of the plurality of compute nodes are reachable by the node by probing all other nodes of the plurality of compute nodes;
dynamically determine, by the node, a current pretense value of the node, wherein the current pretense value is a sum of all quora values of a subset of the plurality of compute nodes that are currently reachable by the node, plus the quora value of the compute node; and
when the current pretense value is less than a quorum for the distributed computing system, recognize the existence of the split-brain condition.

10. The non-transitory machine readable medium of claim 9, wherein the instructions further comprise instructions to determine by a particular node of the plurality of compute nodes whether the particular node is part of a dominant set of the plurality of compute nodes or part of a yielding set of the plurality of compute nodes.

11. The non-transitory machine readable medium of claim 9, wherein the instructions further comprise instructions to responsive to determining existence of the split-brain condition, discontinue, by the node, further processing of transactions relating to the application.

12. The non-transitory machine readable medium of claim 9, wherein the instructions further comprise instructions to responsive to determining existence of the split-brain condition, perform an optimistic mitigation approach by:
   creating, by the node, a checkpoint; and
   continuing, by the node, processing of transactions relating to the application, including journaling, the transactions by persisting a current pretense value of the node with each of the transactions.

13. The non-transitory machine readable medium of claim 12, wherein the instructions further comprise instructions to responsive to resolution of the split-brain condition, resolve, by the node, any conflicting transactions of the journaled transactions by:
   reverting to the checkpoint;
   retrieving journals from other nodes of the plurality of compute nodes;
   sort-merging transactions performed subsequent to the checkpoint;
   replaying the sort-merged transactions;
   when said replaying identifies conflicting transactions for a particular record, retaining a first transaction of the conflicting transactions having a highest pretense value and discarding a second transaction of the conflicting transactions having a lower pretense value and an earlier timestamp; and
   when said replaying does not identify any conflicting transactions for a particular transaction associated with the particular record, then committing the particular transaction.

14. The method of claim 9, wherein ordering the plurality of compute nodes in order of increasing importance to the application from 1 to N comprises generating a sorted list in which a first compute node in the list is of least importance to the application and a last compute node in the list is of greatest importance to the application.

15. A system comprising:
   a processing resource; and
   a non-transitory computer-readable medium, coupled to the processing resource, having stored therein instructions that, when executed by the processing resource, cause the processing resource to:
   identify a number, N, of a plurality of compute nodes within a distributed computing system that runs an application, wherein during normal operation of the distributed computing system a unified state is maintained by synchronizing shared state information among the plurality of compute nodes;
   order the plurality of compute nodes in order of increasing importance to the application from 1 to N, the importance to the application being based on one or more of compute capacity, compute performance, system or environment robustness of a compute node;
   assign a quora value, $q_n$, to each of the plurality of compute nodes in accordance with the ordering, wherein $q_{1=1}$ and each subsequent quora value, $q_n+1$, is a sum of all prior quora values, $q_1$ to $q_n$, plus either 1 or a current value of n;
   determine existence of a split-brain condition; and
   perform a mitigation approach,
   wherein the determination regarding the existence of the split-brain condition comprises instructions that cause the processing resource to:
      determine which of the plurality of compute nodes are reachable by the node by probing all other nodes of the plurality of compute nodes;
      dynamically determine a current pretense value of the node,
   wherein the current pretense value is a sum of all quora values of a subset of the plurality of compute nodes that are currently reachable by the node, plus the quora value of the compute node; and
      when the current pretense value is less than a quorum for the distributed computing system, recognize the existence of the split-brain condition.

16. The system of claim 15, wherein the instructions further cause the processing resource to determine by a particular node of the plurality of compute nodes whether the particular node is part of a dominant set of the plurality of compute nodes or part of a yielding set of the plurality of compute nodes.

17. The system of claim 15, wherein the instructions further cause the processing resource to instructions to responsive to determining existence of the split-brain condition, perform an optimistic mitigation approach by:
   creating, by the node, a checkpoint; and
   continuing, by the node, processing of transactions relating to the application, including journaling, the transactions by persisting a current pretense value of the node with each of the transactions.

18. The system of claim 17, wherein the instructions further cause the processing resource to responsive to resolution of the split-brain condition, resolve, by the node, any conflicting transactions of the journaled transactions by:
   reverting to the checkpoint;
   retrieving journals from other nodes of the plurality of compute nodes;
   sort-merging transactions performed subsequent to the checkpoint;
   replaying the sort-merged transactions;
   when said replaying identifies conflicting transactions for a particular record, retaining a first transaction of the conflicting transactions having a highest pretense value and discarding a second transaction of the conflicting transactions having a lower pretense value and an earlier timestamp; and
   when said replaying does not identify any conflicting transactions for a particular transaction associated with the particular record, then committing the particular transaction.

19. The method of claim 15, wherein ordering the plurality of compute nodes in order of increasing importance to the application from 1 to N comprises generating a sorted list in which a first compute node in the list is of least importance to the application and a last compute node in the list is of greatest importance to the application.

20. The method of claim 15, wherein the instructions further cause the processing resource to, responsive to determining existence of the split-brain condition, discontinue, by the node, further processing of transactions relating to the application.

* * * * *